Patented Oct. 21, 1952

2,615,024

UNITED STATES PATENT OFFICE 2,615,024

BASIC ESTERS AND AMIDES OF 7-SUBSTITUTED-COUMARIN-4-ACETIC ACIDS AND SALTS AND PROCESSES OF PREPARATION

Raymond O. Clinton, Rensselaer County, and Stanley C. Laskowski, Albany County, N. Y., assignors to Sterling Drug Inc., New York, N. Y., a corporation of Delaware No Drawing. Application October 13, 1949, Serial No. 121,227

20 Claims. (Cl. 260—294.3)

This invention relates to basic esters and amides derived from 7-substituted-coumarin-4-acetic acids, to salts of said esters and amides, and to methods of preparing the same. These new compounds have useful pharmaceutical properties. For instance, some of them are effective as local anesthetics.

More particularly, the basic esters and amides of this invention are those having the general formula

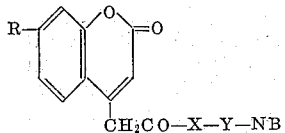

where R is a lower alkyl or a lower alkoxy radical, X is O or NH, Y is a lower alkylene radical and NB is a lower aliphatic-like tertiary-amino radical. In the above general formula R contains preferably 1 to 6 carbon atoms. Thus, when alkyl, R includes methyl, ethyl, n-propyl, isopropyl, n-butyl, 2-butyl, isoamyl, n-hexyl and the like. When R is alkoxy, radicals included are methoxy, ethoxy, n-propoxy, isopropoxy, n-butoxy, 2-butoxy, 3-amoxy, n-hexoxy and the like. The lower alkylene radical, designated as Y in the above general formula, contains 2 to 6 carbon atoms, and has its two free valence bonds on different carbon atoms. Thus Y includes such examples as —CH₂CH₂—, —CH₂CH₂CH₂—,

—CH₂CH₂CH₂CH₂—

—CH(CH₃)CH(CH₃), —CH₂CH(CH₃)

—CH(CH₃)CH₂—

—CH₂CH(C₂H₅), —CH₂CH₂CH(CH₃)

—CH₂CH₂CH₂CH₂CH₂—

—CH₂CH₂CH₂CH(CH₃)

—CH₂CH₂CH₂CH₂CH₂CH₂—, and the like. The lower alkylene radical can be substituted by a hydroxyl group, e. g. —CH₂CH(OH)CH₂—, and also can be interrupted by atoms such as sulfur and oxygen, e. g. —CH₂CH₂SCH₂CH₂—,

—CH₂CH₂CH₂OCH₂CH₂—

The lower aliphatic-like tertiary-amino radical, NB, comprehends lower dialkylamino groups illustrated by examples such as dimethylamino, diethylamino, di-n-butylamino, ethylmethylamino, and the like; and saturated N-heteromonocyclic groups having 5 to 6 ring atoms, illustrated by examples such as 1-piperidyl, 2-methyl-1-piperidyl, 2,6-dimethyl-1-piperidyl, 1-pyrrolidyl, 4-morpholinyl, and the like. In other words, HNB designates a lower aliphatic-like secondary-amine as illustrated by diethylamine, di-n-butylamine, morpholine, 2,6-dimethylpiperidine, and the like.

Compounds comprehended by our invention include the following:

1. 2-(2-methyl-1-pyrrolidyl)ethyl 7-ethoxycoumarin-4-acetate.

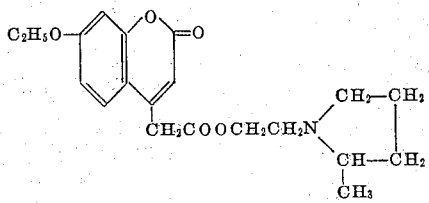

2. 4-diethylaminobutyl 7-n-hexylcoumarin-4-acetate.

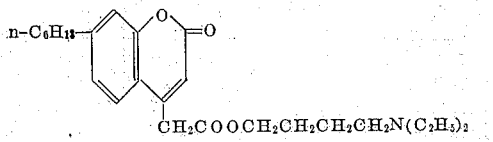

3. 3-(4-morpholinyl)propyl 7-(2-butoxy)coumarin-4-acetate.

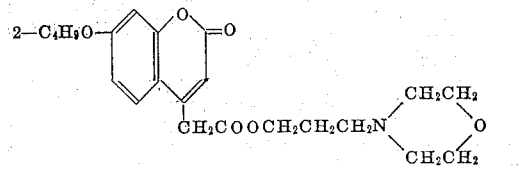

4. 3-dimethylamino-2-propyl 7-n-propoxycoumarin-4-acetate.

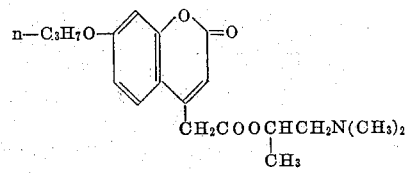

5. N-(2-di-n-butylaminoethyl)-7-methoxycoumarin-4-acetamide.

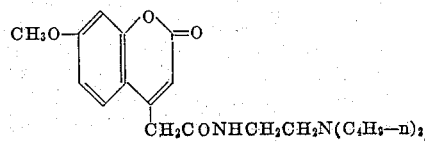

6. N-(3-(1-piperidyl)propyl)-7-methylcoumarin-4-acetamide.

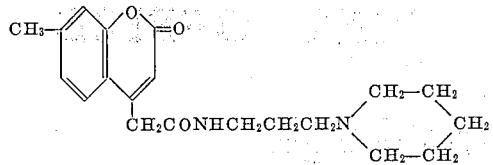

7. N-(2-diethylaminoethyl)-7-n-amylcoumarin-4-acetamide.

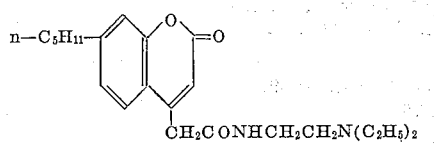

8. N-(3-(2,6-dimethyl-1-piperidyl)propyl)-7-n-butoxycoumarin-4-acetamide.

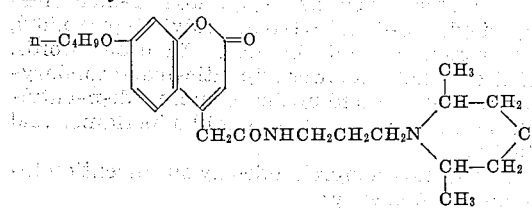

The basic compounds of our invention can be prepared by the procedure illustrated by the following general equation:

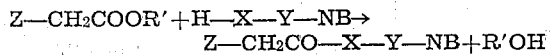

where Z is the above described 7-substituted-4-coumarin ring, R' is lower alkyl and X, Y and NB have the meanings hereinabove described. Where X is O, a basic ester is formed. For example, 2-diethylaminoethyl 7-ethoxycoumarin-4-acetate is formed by the reaction of ethyl 7-ethoxycoumarin-4-acetate with 2-diethylaminoethanol. Where X is NH, a basic amide results. For example, N-(3-(7-piperidyl)propyl)-7-n-butylcoumarin-4-acetamide results when the reactants are ethyl 7-n-butylcoumarin-4-acetate and 3-(1-piperidyl)propylamine. This method is preferred for preparing our basic amides.

Another method of preparing our basic esters, and the method preferably used in practicing our invention, is illustrated by the following equation:

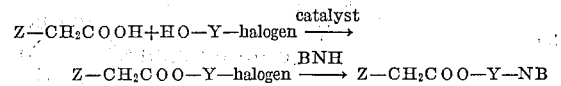

where Z, X and NB have the meanings hereinabove described and halogen is preferably chlorine or bromine. This esterification is carried out in the presence of a strong acidic catalyst, e. g. sulfuric acid, ethanesulfonic acid, toluenesulfonic acid, hydrochloric acid, zinc chloride, etc. An example of this procedure is the reaction of 7-ethylcoumarin-4-acetic acid with 2-bromoethanol in the presence of concentrated sulfuric acid to yield 2-bromoethyl 7-ethylcoumarin-4-acetate which when treated with dimethylamine yields 2-dimethylaminoethyl 7-ethylcoumarin-4-acetate.

Some other methods which are usually successfully employed in preparing esters were found by us to be inoperative in attempts to prepare the basic esters of our invention. For example, the 7-substituted-coumarin-4-acetic acids could not be converted to the basic esters by reaction with a tertiary-aminoalkyl halide in isopropanol solution. This attempted reaction is complicated by the extreme ease of decarboxylation of the coumarin-4-acetic acids. This same ease of decarboxylation was noted in the attempted related esterification reaction between a 7-substituted-coumarin-4-acetic acid and a tertiary-amino alkanol. In both of these attempted esterification procedures the main product was the corresponding 7-substituted-4-methyl-coumarin. Also unsuccessful were attempts to prepare as intermediates 7-substituted-coumarin-4-acetyl chlorides by reacting the corresponding acids with thionyl chloride. Presumably the 7-substituted-coumarin-4-acetyl chlorides are formed; however a second chlorine atom enters the coumarin nucleus, probably at the 3- or 4-position.

The 7-substituted-coumarin-4-acetic acids necessary as precursors in the preparation of our basic esters and amides were prepared by the v. Pechman reaction [see v. Pechman and Duisberg, Ber. 16, 2119 (1883), and Sethna and Shah, Chem. Rev. 36, 1 (1945)] from a meta-substituted-phenol and acetone dicarboxylic acid (prepared in situ from citric acid). In general these syntheses offered no difficulty.

It is often convenient to isolate and use the basic esters and amides of our invention as the water-soluble hydrochloric acid addition salts. It is, of course, understood that other water-soluble salts, such as those derived from other nontoxic inorganic and organic acids likewise have therapeutic value and are within the scope of our invention. Such salts include hydrobromides, sulfates, phosphates, sulfamates, tartrates, citrates, succinates, acetates, benzoates, oleates, and the like.

The following examples will further illustrate specific embodiments of the invention.

I. 7-SUBSTITUTED-COUMARIN-4-ACETIC ACIDS

The general method of v. Pechman and Duisberg [Dey, J. Chem. Soc. 107, 1616 (1915); v. Pechman and Duisberg, Ber. 16, 2119 (1883)] was used for the preparation of the intermediate 7-substituted-coumarin-4-acetic acids. As a result of numerous experiments it was found that this procedure was critical, especially as regards the in situ preparation of the acetone dicarboxylic acid. Of all modifications tried, the following procedure, illustrating the preparation of 7-methylcoumarin-4-acetic acid, gave the highest yields and duplicability of results:

A mixture of 210 g. (1 mole) of citric acid monohydrate and 280 ml. of concentrated sulfuric acid was stirred at room temperature for sixty minutes, and then slowly heated (rate of heating governed by foaming) to 70° C. After thirty-five minutes at this temperature, with stirring throughout, the evolution of carbon monoxide had slackened, and the clear solution was rapidly cooled to 0° C. To this stirred solution was added 86.4 g. (0.8 mole) of redistilled m-cresol and 112 ml. of concentrated sulfuric acid, each in three equal portions, at such a rate that the internal temperature did not exceed 10° C. The resulting mixture was stored at 0° C. for sixteen hours, poured into two liters of ice, and the resulting crystalline precipitate was filtered off and washed thoroughly with water. The precipitate was stirred with 1000 ml. of 1 N sodium carbonate solution for fifteen minutes at 65° C., filtered, and the insoluble material was washed with water. Acidification of the combined filtrate and washings gave 52.1 g. (31%) of 7-methylcoumarin-4-acetic acid, M. P. 191–192° C. [Dey and Radhabai, J. Indian Chem. Soc., 11, 635 (1934), report a M. P. of 190° C.] The carbonate-insoluble portion (31.2 g.) was identified as 4,7-dimethylcoumarin.

The above procedure was varied by lengthening or shortening the period of heating, by variations in temperature during the condensation, by altering the proportion of sulfuric acid, and through use of sulfur trioxide-sulfuric acid mixtures. No improvement in yield was discernible in any of these modifications.

By the above procedure, there were prepared the following coumarin-4-acetic acids:

7-methoxycoumarin-4-acetic acid, 51% yield, M. P. 175–176° C. [Dey, J. Chem. Soc., 107, 1606 (1915), report a M. P. of 187° C.]

7-ethylcoumarin-4-acetic acid, 27.5% yield, M. P. 183–184° C. (from absolute ethanol).

7-butoxycoumarin-4-acetic acid, 81% crude yield, M. P. 91–97° C. (from ethanol-ether). This compound, although not analytically pure, was utilized successfully in the preparation of derivatives.

7-hexoxycoumarin-4-acetic acid, 80% yield, M. P. 123.8–125.8° C. (from ether).

II. Alkyl and Haloalkyl 7-Substituted-Coumarin-4-Acetates

The intermediate alkyl and haloalkyl esters of the foregoing described 7-substituted-4-acetic acids were prepared by esterification of the acids with an alkanol or haloalkanol, respectively, in the presence of concentrated sulfuric acid, using an inert water-immiscible liquid such as benzene as a water carrier with a continuous separator connected to the apparatus. The water which forms during the reaction is collected as a distinct layer in the separator. In general, the esterifications were slow, due to the low solubility of the acids in the inert solvent. However, the method gave better yields than the usual Fischer procedure, which involves dissolving the acid in an anhydrous alkanol or haloalkanol, saturating the solution with gaseous hydrogen chloride and refluxing when necessary. The proportions used and the general procedure are illustrated in the following respective preparations of ethyl 7-ethylcoumarin-4-acetate, 2-bromoethyl 7-methoxycoumarin-4-acetate and 4-chlorobutyl 7-ethylcoumarin-4-acetate:

Ethyl 7-ethylcoumarin-4-acetate

A mixture of 46.4 g. (0.2 mole) of 7-ethylcoumarin-4-acetic acid, 28.0 g. (0.6 mole) of ethanol, 6 ml. of concentrated sulfuric acid and 1250 ml. of dry benzene was refluxed for twelve hours, at the end of which period 8.5 ml. of water had been collected in the continuous separator. The cooled benzene solution was washed with aqueous sodium bicarbonate solution and with water, and then evaporated to dryness in vacuo. Recrystallization of the solid residue from ethyl acetate, with charcoaling, gave a total (including material from the mother liquors) of 48.0 g. (92.5%) of ethyl 7-ethylcoumarin-4-acetate in the form of white cottony needles, M. P. 103–104° C.

Other alkyl esters prepared according to the above procedures include ethyl 7-methylcoumarin-4-acetate, 88.5% yield, M. P. 125–126° C. and ethyl 7-methoxycoumarin-4-acetate, 84% yield, M. P. 101–102° C.

2-bromoethyl 7-methoxycoumarin-4-acetate

The procedure described in the immediately preceding paragraph was followed using 35.1 g. (0.15 mole) of 7-methoxycoumarin-4-acetic acid, 56.3 g. (0.045 mole) of 2-bromoethanol, 1000 ml. of dry benzene, 6 ml. of concentrated sulfuric acid and a reflux period of eight hours. The recrystallized product, 2-bromoethyl 7-methoxycoumarin-4-acetate, was obtained in 74% yield (36.2 g.) as rosettes of white needles, M. P. 94–95° C., when recrystallized from ethyl acetate.

4-chlorobutyl 7-ethylcoumarin-4-acetate

Following the above procedure using 23.2 g. (0.1 mole) of 7-ethylcoumarin-4-acetic acid, 32.5 g. (0.3 mole) of 4-chlorobutanol, 500 ml. of dry benzene, 6 ml. of concentrated sulfuric acid and a reflux period of twelve hours, there was obtained 13 g. (40%) of 4-chlorobutyl 7-ethylcoumarin-4-acetate as rosettes of white needles, M. P. 75–76° C., from ethanol.

Other haloalkyl 7-substituted coumarin-4-acetates prepared according to the above procedures are listed in Table A.

TABLE A

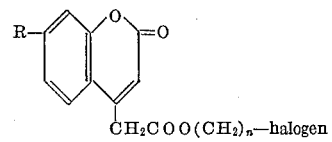

$CH_2COO(CH_2)_n$—halogen

| R | n | halogen | Yield [a] | M. P./° C. |
|---|---|---|---|---|
| $CH_3$ | 2 | Br | 82 | 96–98 |
| $CH_3$ | 3 | Br | 58 | 90–91 |
| $CH_3$ | 3 | Cl | 48 | 85–86 |
| $CH_3$ | 4 | Cl | 55 | 86–87 |
| $CH_3O$ | 3 | Br | 71 | 73–75 |
| $C_2H_5$ | 2 | Br | 86 | 57–58 |
| $C_2H_5$ | 3 | Cl | 75 | 94–96 |
| $C_4H_9O$ | 2 | Cl | 50 | 78–79 |

[a] These yields represent percent conversion without regard to recovered starting material.

Other haloalkyl 7-substituted-coumarin-4-acetates which were prepared according to the foregoing procedures include: 2-bromopropyl 7-methylcoumarin-4-acetate, 53% yield (97% yield based on recovered acid), rosettes of white needles from ethanol, M. P. 90–91° C.; 3-chloropropyl 7-n-butyloxycoumarin-4-acetate, oil; and 4-chlorobutyl 7-methoxycoumarin-4-acetate, oil.

III. Tertiary-Aminoalkyl 7-Substituted-Coumarin-4-Acetates

Most of these basic esters were prepared by the reaction of a haloalkyl 7-substituted-coumarin-4-acetate with two mole proportions of a secondary amine. If the halogen was chlorine, xylene was preferably used as solvent (toluene gave low yields), but for bromine replacement toluene was satisfactory. When attempts were made to effect halogen replacement by heating with excess amine (no solvent) or in benzene, no perceptible reaction took place. This procedure is exemplified by the following preparation of 2-(1-piperidyl)ethyl 7-methoxycoumarin-4-acetate:

A mixture of 8.5 g. (0.025 mole) of 2-bromoethyl 7-methoxycoumarin-4-acetate, 4.3 g. (0.05 mole) of piperidine and 150 ml. of dry toluene was refluxed for seven hours. After cooling the reaction mixture, the separated piperidine hydrobromide was filtered off and the filtrate was washed with five 100 ml. portions of water (small amounts of sodium chloride were used to break emulsions). The toluene layer was dried and concentrated in vacuo (in several cases the bases crystallized at this point, but were not isolated). An excess of ethereal hydrogen chloride was added and the resulting semi-crystalline oil was recrystallized from absolute ethanol yielding the desired ester hydrochloride, 2-(1-piperidyl)ethyl 7-methoxycoumarin-4-acetate hydrochloride, M. P. 183–185° C.

The same basic ester described in the immediately preceding paragraph is also formed when 2-(1-piperidyl)-ethanol is heated with methyl 7-methoxycoumarin-4-acetate in an inert solvent such as toluene or xylene, removing the methanol formed by the reaction by means of a continuous separator attached to the reaction flask.

Other tertiary-aminoalkyl 7-substituted-coumarin-4-acetates, in the form of their hydrochlorides, prepared according to the above procedure of treating a haloalkyl ester with a secondary-amine, are listed in Table B.

TABLE B

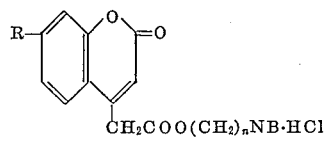

$$\text{CH}_2\text{COO}(\text{CH}_2)_n\text{NB} \cdot \text{HCl}$$

| R | n | NB | Yield, percent | M. P./° C. |
|---|---|---|---|---|
| CH₃ | 2 | N(C₂H₅)₂ | 44 | 144.6–145.8 |
| CH₃ | 2 | NC₅H₁₀ª | 66 | 155–156.4 |
| CH₃ | 2 | NC₄H₈Oᵇ | 39 | 184.8–185.6 |
| CH₃ | 2 | NC₆H₁₂ᶜ | 36 | 86–87 |
| CH₃ | 3 | N(C₂H₅)₂ | 49 | 149–150.2 |
| CH₃ | 3 | NC₅H₁₀ª | 71 | 177–180.6 |
| CH₃ | 3 | NC₆H₁₂ᶜ | 32 | 133–135 |
| CH₃ | 3 | NC₄H₈Oᵇ | 57 | 186.2–188.8 |
| CH₃O | 2 | N(C₂H₅)₂ | 27 | 167.6–169.9 |
| CH₃O | 2 | NC₄H₈Oᵇ | 53 | 155–155.8 |
| CH₃O | 2 | NC₆H₁₂ᶜ | 34 | 164–166.4 |
| CH₃O | 2 | N(C₄H₉-n)₂ | 50 | 75–80 |
| CH₃O | 3 | N(C₂H₅)₂ | 47 | 134–136 |
| CH₃O | 3 | NC₅H₁₀ª | 65 | 145.8–148.2 |
| CH₃O | 3 | NC₆H₁₂ᶜ | 37 | 130–133 |
| CH₃O | 3 | NC₄H₈Oᵇ | 53 | 158.2–162.6 |
| C₂H₅ | 2 | NC₅H₁₀ª | 35 | 149–151 |

ª NC₅H₁₀ is 1-piperidyl.
ᵇ NC₄H₈O is 4-morpholinyl.
ᶜ NC₆H₁₂ is 2-methyl-1-piperidyl.

IV. N-(TERTIARY-AMINOALKYL)-7-SUBSTITUTED-COUMARIN-4-ACETAMIDES

The basic amides of the 7-substituted-coumarin-4-acetic acids of our invention were prepared by heating a tertiary-aminoalkylamine (1 mole) and a lower alkyl 7-substituted-coumarin-4-acetate (1 mole) in an inert solvent, preferably xylene. The mixture was refluxed for twenty to twenty-four hours, concentrated in vacuo, and the resulting solid bases were purified by dissolving in dilute hydrochloric acid, filtering the resulting solutions, and reprecipitating the bases with ammonium hydroxide. In general, the basic amides could be satisfactorily recrystallized from benzene-petroleum ether mixtures or from ethyl acetate-petroleum ether mixtures. The use of toluene as solvent gave lower yields than when xylene was used.

Conversion to the hydrochlorides was effected by dissolving the N-(tertiary-aminoalkyl)-7-substituted-coumarin-4-acetamides in an excess of warm absolute ethanolic hydrogen chloride followed by complete precipitation (usually as in oil) with absolute ether. Trituration of the oily precipitate with dry acetone or with boiling ethyl acetate usually effected crystallization. Absolute ethanol, or a mixture of absolute ethanol with ethyl acetate and/or ether, was satisfactory for recrystallization of these N-(tertiary-aminoalkyl)-7-substituted-coumarin-4-acetamide hydrochlorides.

N-(tertiary-aminoalkyl)-7-substituted-coumarin-4-acetamides and their hydrochlorides prepared according to the above general procedures are listed in Table C.

TABLE C

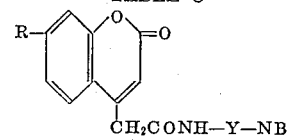

$$\text{CH}_2\text{CONH--Y--NB}$$

| R | Y-NB | Yield, percent | M. P./° C. | M. P. hydrochlorides/° C. |
|---|---|---|---|---|
| CH₃ | CH₂CH₂N(C₂H₅)₂ | 50 | 118–120 | 150–151 |
| CH₃ | CH₂CH₂CH₂N(C₂H₅)₂ | 50 | 143–145 | 99–101 |
| CH₃ | CH₂CH₂CH₂CH₂N(C₂H₅)₂ | 51 | 154–155 | 146–150 |
| CH₃ | CH(CH₃)CH₂CH₂CH₂N(C₂H₅)₂ | 25 | 160–163 | 153–154 |
| CH₃ | CH₂CH(OH)CH₂N(C₂H₅)₂ | 30 | 144–145 | 173–175 |
| CH₃ | CH₂CH₂SCH₂CH₂N(C₂H₅)₂ | 65 | 138–140 | 120–121 |
| CH₃ | CH₂CH₂CH₂NC₆H₁₂ª | 50 | 147–148 | |
| CH₃O | CH₂CH₂N(C₂H₅)₂ | 47 | 122–123 | 150–151 |
| CH₃O | CH₂CH₂CH₂N(C₂H₅)₂ | 86 | 140–141 | 164–165 |
| CH₃O | CH(CH₃)CH₂CH₂CH₂N(C₂H₅)₂ | 35 | 159–160 | 146–148 |
| CH₃O | CH₂CH₂SCH₂CH₂N(C₂H₅)₂ | 68 | 123–124 | |
| C₂H₅ | CH₂CH₂CH₂N(C₂H₅)₂ | 71 | 120–122 | 174–175 |
| C₂H₅ | CH(CH₃)CH₂CH₂N(C₂H₅)₂ | 40 | 151–152 | 154–158 |
| C₂H₅ | CH₂CH(OH)CH₂N(C₂H₅)₂ | 40 | 127–128 | |
| C₂H₅ | CH₂CH₂SCH₂CH₂N(C₂H₅)₂ | 55 | 114–115 | 126–127 |

ª NC₆H₁₂ is 2-methyl-1-piperidyl.

We claim:
1. A member of the group consisting of: a compound having the formula

$$\text{CH}_2\text{CO--X--Y--NB}$$

where R is a member of a group consisting of lower alkyl radicals and lower alkoxy radicals, X is a member of the group consisting of O and NH, Y is a lower alkylene radical and NB is a member of the group consisting of lower dialkylamino radicals, 1-piperidyl radicals, 1-pyrrolidyl radicals and 4-morpholinyl radicals; and acid-addition salts thereof.

2. A compound having the formula $$\text{CH}_2\text{COO--Y--NB}$$

where R is a lower alkyl radical, Y is a lower alkylene radical and NB is 2-methyl-1-piperidyl radical.

3. 3-(2-methyl-1-piperidyl)propyl 7-methylcoumarin-4-acetate.

4. 3-(1-piperidyl)propyl 7-methylcoumarin-4-acetate.

5. The process of preparing a basic ester having the formula

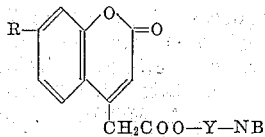

where R is a member of a group consisting of a lower alkyl radical and a lower alkoxy radical, Y is a lower alkylene radical and NB is a member of the group consisting of lower dialkylamino radicals, 1-piperidyl radicals, 1-pyrrolidyl radicals and 4-morpholinyl radicals, which comprises treating the corresponding haloalkyl ester having the formula

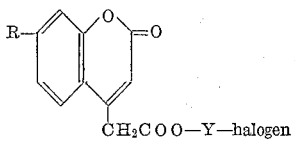

with a secondary amine having the formula HNB where NB has the meaning designated hereinabove.

6. The process of preparing a basic ester having the formula

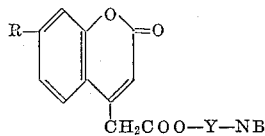

where R is a lower alkyl radical, Y is a lower alkylene radical and NB is a 2-methyl-1-piperidyl radical, which comprises treating the corresponding haloalkyl ester having the formula

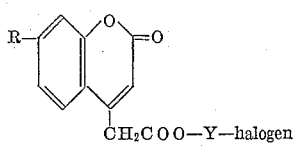

with 2-methyl-piperidine.

7. The process of preparing 3-(2-methyl-1-piperidyl)propyl 7 - methylcoumarin - 4 - acetate which comprises reacting a 3-halopropyl 7-methylcoumarin-4-acetate with 2-methylpiperidine.

8. The process of preparing 3-(1-piperidyl)-propyl 7-methylcoumarin-4-acetate which comprises reacting a 3-halopropyl 7-methylcoumarin-4-acetate with piperidine.

9. A compound having the formula

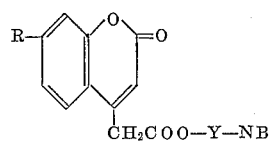

where R is a lower alkyl radical, Y is a lower alkylene radical and NB is a 1-piperidyl radical.

10. A compound having the formula

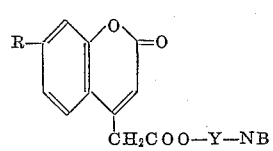

where R is a lower alkoxy radical, Y is a lower alkylene radical and NB is a 2-methyl-1-piperidyl radical.

11. A compound having the formula

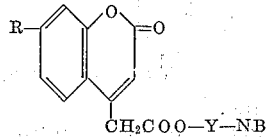

where R is a lower alkoxy radical, Y is a lower alkylene radical and NB is a 1-piperidyl radical.

12. 2-(1-piperidyl)ethyl 7-methylcoumarin-4-acetate.

13. 3 - (2-methyl-1-piperidyl)propyl 7-methoxycoumarin-4-acetate.

14. 2-(2-methyl-1-piperidyl)ethyl 7-methoxycoumarin-4-acetate.

15. The process of preparing a basic ester having the formula

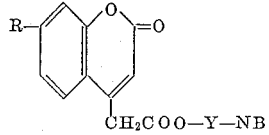

where R is a lower alkyl radical, Y is a lower alkylene radical and NB is a 1-piperidyl radical, which comprises treating the corresponding haloalkyl ester having the formula

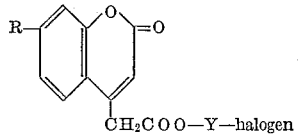

with piperidine.

16. The process of preparing a basic ester having the formula

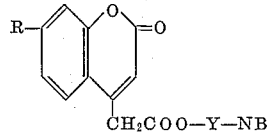

where R is a lower alkoxy radical, Y is a lower alkylene radical and NB is a 2-methyl-1-piperidyl radical, which comprises treating the corresponding haloalkyl ester having the formula

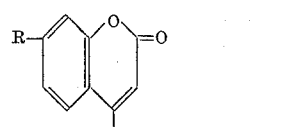

with 2-methylpiperidine.

17. The process of preparing a basic ester having the formula

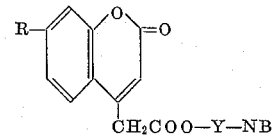

where R is a lower alkoxy radical, Y is a lower alkylene radical and NB is a 1-piperidyl radical, which comprises treating the corresponding haloalkyl ester having the formula

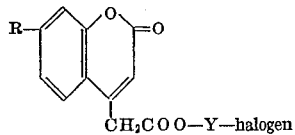

with piperidine.

18. The process of preparing 2-(1-piperidyl)-ethyl 7-methoxycoumarin-4-acetate which comprises reacting a 2-haloethyl 7-methylcoumarin-4-acetate with piperidine.

19. The process of preparing 3-(2-methyl-1-piperidyl) propyl 7 - methoxycoumarin-4-acetate which comprises reacting a 3-halopropyl 7-methoxycoumarin-4-acetate with 2-methylpiperidine.

20. The process of preparing 2-(2-methyl-1-piperidyl) ethyl 7 - methoxycoumarin - 4-acetate which comprises reacting a 2-haloethyl 7-methoxycoumarin-4-acetate with 2-methylpiperidine.

RAYMOND O. CLINTON.
STANLEY C. LASKOWSKI.

No references cited.